July 17, 1928.

G. F. HOCHRIEM 1,677,826

ATTACHMENT FOR WEIGHT RECORDING SCALES

Filed Jan. 15, 1926   2 Sheets-Sheet 1

Witness:
Stephen F. Osborn

Inventor:
Gustav F. Hochriem
by Frank L. Belknap
Atty.

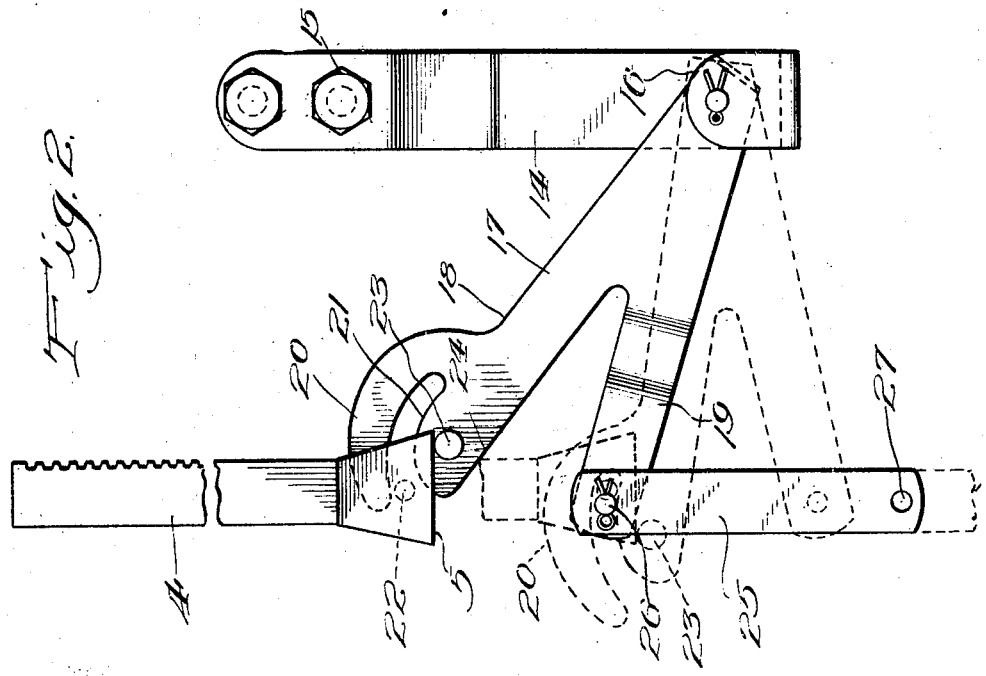
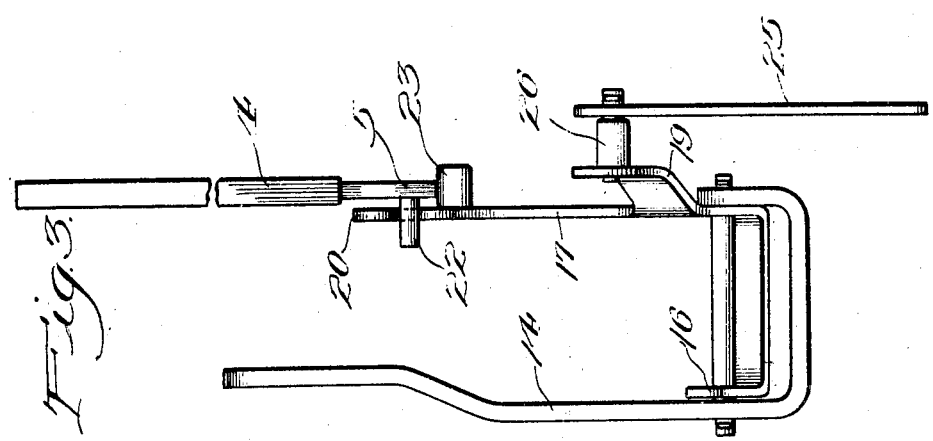

Patented July 17, 1928.

1,677,826

UNITED STATES PATENT OFFICE.

GUSTAV F. HOCHRIEM, OF CHICAGO, ILLINOIS, ASSIGNOR TO RHODES-HOCHRIEM MANUFACTURING CO., OF CHICAGO, ILLINOIS, A CORPORATION OF ILLINOIS.

ATTACHMENT FOR WEIGHT-RECORDING SCALES.

Application filed January 15, 1926. Serial No. 81,385.

This invention relates to improvements in an attachment for weight recording scales, and refers more particularly to a mechanism located between the levers actuating the load-receiving mechanism and the rack bar actuating the weight recording mechanism.

The present invention is particularly directed to the improvement of the means for sealing or compensating differences of fractions of pounds in the weight recording mechanism of the scale. The mechanism is adapted to have a simultaneous vertical and lateral movement to move equal distances for equal increments of load upon the load-receiving mechanism of the scale.

In the drawings,

Figure 2 is a greatly enlarged elevational view of the attachment of the present invention, and Figure 3 is an end elevational view of Figure 2.

Figure 1:
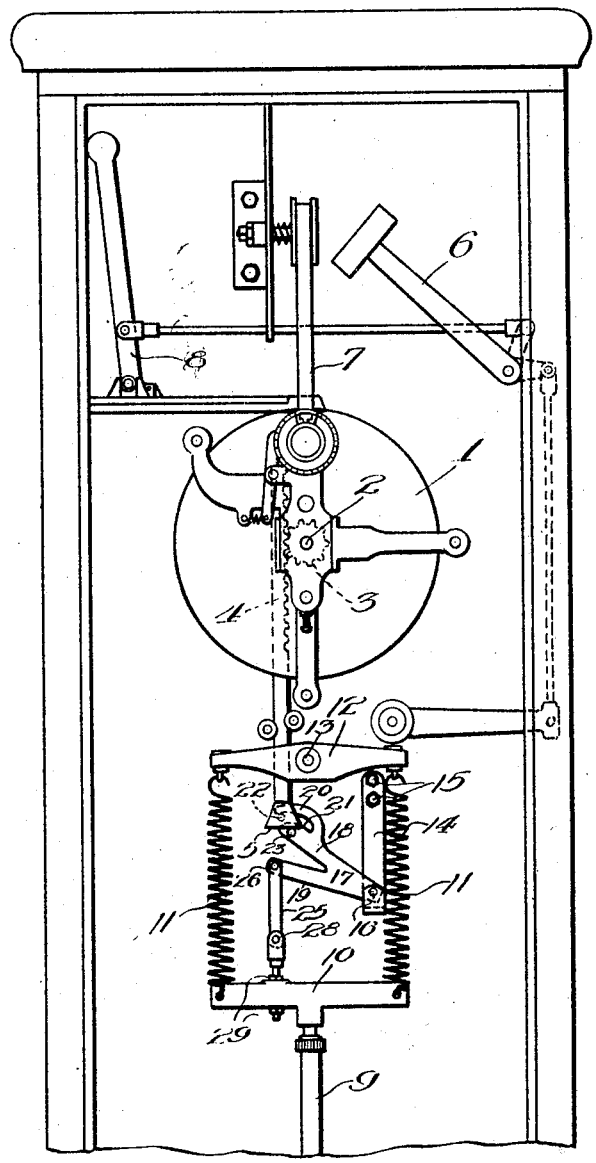
Figure 1 is a diagrammatic side elevational view of a scale, utilizing the device of the present invention.

Referring in detail to the drawings, 1 designates a weight recording mechanism which in the present instance takes the form of a printing wheel having weight indicating characters on its periphery. To the weight recording wheel 1 may be keyed a shaft 2, which has keyed thereon a pinion 3 adapted to mesh with the teeth of a vertically positioned rack bar 4, the lower end of which terminates in a wide sealing surface 5. A weight printing hammer 6 is adapted to contact the surface of the printing ribbon 7, which impresses the weight upon a ticket, not shown, automatically moved forward and ejected by means of the mechanism shown generally at 8.

I have illustrated my invention as being attached to a weighing scale of the weight-printing-and-ejecting type. It is obvious, of course, that the invention may be applied to any weighing scale utilizing a pinion and rack.

A steel yard rod 9, suspended from the steel yard frame 10, may be connected to the load-receiving mechanism of the scale. The two ends of the lower arm of the steel yard frame receive coil springs 11 which are anchored to the upper structure of the steel yard frame 12 which may be pivoted at 13. The parts heretofore described are more or less general and are not described in detail since they form no part of the present invention.

Describing now more in detail the present invention, and referring particularly to Figures 2 and 3, the bracket 14 may be attached to the frame or other suitable support by means of the screws 15. This bracket is provided intermediate its length with the fixed pivot 16 adapted to act as a fixed pivot for the arm 17. This arm 17 is preferably of the peculiar shape shown in the drawings, one edge tapering upwardly at a pronounced angle relative to the other edge to provide the upper section 18 and lower section 19. This upper section 18 is provided with an enlarged hook portion or guide 20 longitudinally recessed inwardly from its end, shown at 21, which recess preferably takes the form of a segment of a circle, being adapted to contact the pin 22 mounted on the lower end of the rack bar 4 for the purpose of causing the rack bar 4 to move synchronously with the arm 17. The lower widened surface 5 of the rack bar 4 is adapted to contact a pin 23 mounted on the lower part 24 of the hook below the recess 21.

The lower section 19 of the arm 17 is adapted to have pivotal connection with the link 25, which link is apertured at its upper end to register with the pin 26 mounted on said lower section 19, resulting in said pivotal connection. The lower end of the link 25 is also apertured, as shown at 27, to register with the pivot 28, which pivot 28 is connected in turn to the lower cross arm 10 of the steel yard frame.

As shown clearly in Figure 3, the lower section 19 may be slightly offset from the general plane of the arm 17 for the purpose of permitting the use of the shorter pin 26.

Describing now the operation of the attachment, in heavy duty scales, such as those designed to record several hundreds of pounds of weight, the distances the weight recording or indicating mechanism travels for the increments of load are relatively short. This is especially true where springs are employed to resist the loads and where the weight recording or indicating device is rotatable by means of a rack bar connected to the lever mechanism. It will be immediately obvious that slight inaccuracies of construction result in serious errors in weight recording.

The height of the pin 23 is fixed by the adjusting nuts 29 which raise or lower the link 25, such raising or lowering being transmitted to the arm 17 and thus to the pin 23, so that when no load is on the scale the dial 1 will be at zero. A test weight may be then placed on the scale, which will cause the pin 23 to swing downwardly and to the left, resulting in a new area of surface 5 contacting said pin. If the weight recording dial 1 then registers a lesser weight, the surface 5 is scraped at this point of contact until the dial indicates the correct amount. If the dial indicates a greater weight, then the pin 28 must be raised and the initial corners of the surface 5 cut away until the dial is at zero, after which the test weights are applied.

By continuing these tests and scrapings of the lower edge 5 of the rack bar, the scale is accurately sealed for its entire capacity. To insure a synchorous movement of said rack bar with the arm 17, I have provided the pin 22 registering with the recess 21.

The pivot 26 cooperatively associated with link 25, functions to cause the latter to reciprocate in the same vertical plane as the rack bar 4.

By the use of the present invention, it is a simple matter to scrape the lower surface 5 where necessary. This is accomplished by unscrewing the pin 22 and vertically lifting the rack bar 4 until the lower surface 5 is above the lower edge of the recess 21, at which time a thin blade file can be inserted to scrape the lower surface 5 to the extent necessary. I may refer to the pin 23 as the sealing pin, the pin 22 as the pin which causes synchronous movement of the rack bar 4 and arm 17, whereas I may designate the pin 26 as the pin having co-operative engagement with the load-receiving mechanism.

I claim as my invention:

1. In a scale, a rack bar and a weight indicating mechanism actuated thereby, a load-receiving mechanism, a link and a pivot therefor connected to the load-receiving mechanism, an arm and a fixed pivot therefor, and pins on said arm, one of said pins connected to said link and the other pin being caused to contact the lower end of the rack bar, said lower end of the rack bar being sufficiently wide to contact with said contacting pin throughout its movements.

2. In a scale, a rack bar and a weight indicating mechanism actuated thereby, a load-receiving mechanism, a link and a pivot therefor connected to the load-receiving mechanism, an arm and a fixed pivot therefor, and pins on said arm, one of said pins connected to said link and the other pin being caused to contact the lower end of the rack bar, said lower end of the rack bar being sufficiently wide to contact with said contacting pin throughout its movements, said arm being provided with a longitudinal recess, a separate pin on the lower end of the rack bar adapted to travel in said longitudinal recess to cause the rack bar and arm to move synchronously.

3. In a scale, a weight indicator and a rack bar therefor, load resisting springs and a cross-bar to transmit the pull of the load to said springs, a pivot on said cross-bar, a stationary pivot, an arm mounted on said stationary pivot, a link connected to the pivot on the cross-bar, and pins on said arm, one of which connects said link with said arm and the other pin engaging the operating bar, said arm being provided with a curved slot intermediate its length, and a pin on the lower portion of said operating bar adapted to travel in said slot.

4. In a scale, a weight indicator and an operating bar therefor, weight resisting springs, a cross-bar connected to the weight resisting springs, a pivot supported by said cross-bar and means connecting said pivot to the load-receiving mechanism of the scale, a stationary pivot, an arm connected to the stationary pivot, and a link connected to the pivot supported by the cross-bar, said link being adapted to reciprocate in the same vertical plane as the operating bar, said arm being caused to travel in a vertical arc when the scale is loaded and engaging the operating device for the indicator to cause it to move equal distances for equal increments of load on the scale.

GUSTAV F. HOCHRIEM.